United States Patent
Chu et al.

(10) Patent No.: US 11,859,329 B2
(45) Date of Patent: Jan. 2, 2024

(54) METHOD AND DEVICE FOR CONTROLLING LAUNDRY EQUIPMENT, AND STORAGE MEDIUM

(71) Applicant: BEIJING XIAOMI MOBILE SOFTWARE CO., LTD., Beijing (CN)

(72) Inventors: Yueyue Chu, Beijing (CN); Wei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 198 days.

(21) Appl. No.: 17/386,241

(22) Filed: Jul. 27, 2021

(65) Prior Publication Data

US 2022/0243375 A1 Aug. 4, 2022

(30) Foreign Application Priority Data

Feb. 3, 2021 (CN) .......................... 202110152123.7

(51) Int. Cl.
*D06F 34/05* (2020.01)
*D06F 34/32* (2020.01)
*D06F 33/36* (2020.01)
*D06F 103/68* (2020.01)
*D06F 101/20* (2020.01)
*D06F 105/54* (2020.01)

(52) U.S. Cl.
CPC .............. *D06F 34/05* (2020.02); *D06F 33/36* (2020.02); *D06F 34/32* (2020.02); *D06F 2101/20* (2020.02); *D06F 2103/68* (2020.02); *D06F 2105/54* (2020.02)

(58) Field of Classification Search
CPC .................................. D06F 34/05; D06F 33/36
See application file for complete search history.

(56) References Cited

U.S. PATENT DOCUMENTS 9,767,332 B1  9/2017  Volmut
2016/0215430 A1  7/2016  Ha
(Continued)

FOREIGN PATENT DOCUMENTS

CN  103966797 A  8/2014
CN  108070978 A  5/2018
(Continued)

OTHER PUBLICATIONS

European Search Report in European application No. 21188114.9, dated Jan. 28, 2022, (12 pages).
(Continued)

*Primary Examiner* — Michael E Barr
*Assistant Examiner* — Kevin G Lee
(74) *Attorney, Agent, or Firm* — Arch & Lake LLP

(57) ABSTRACT

The method is implemented at a washing mode sharing platform. A to-be-shared washing parameter of at least one first laundry equipment, and a to-be-shared washing mode corresponding to the to-be-shared washing parameter, are acquired. A historical data set is generated based on the to-be-shared washing parameter and the to-be-shared washing mode. A target washing mode and a target washing parameter corresponding to the target washing mode are determined from the historical data set. The target washing mode and the target washing parameter are sent to second laundry equipment.

12 Claims, 12 Drawing Sheets

A to-be-shared washing parameter of at least one first laundry equipment, and a to-be-shared washing mode corresponding to the to-be-shared washing parameter, are acquired — 101

A historical data set is generated based on the to-be-shared washing parameter and the to-be-shared washing mode — 102

A target washing mode and a target washing parameter corresponding to the target washing mode are determined from the historical data set — 103

The target washing mode and the target washing parameter are sent to second laundry equipment — 104

(56) References Cited

U.S. PATENT DOCUMENTS

2018/0305851 A1   10/2018  Kwon
2019/0153657 A1    5/2019  Clayton et al.
2021/0165377 A1*  6/2021  Yoon ........................ D06F 34/28

FOREIGN PATENT DOCUMENTS

| | | |
|---|---|---|
| CN | 108411565 A | 8/2018 |
| CN | 109385805 A | 2/2019 |
| CN | 111796736 A | 10/2020 |
| EP | 3042506 A1 | 7/2016 |
| KR | 20090039182 A | 4/2009 |
| WO | WO-2014117603 A1 * | 8/2014 ............. D06F 33/00 |

OTHER PUBLICATIONS

First Office Action of the Chinese application No. 202110152123.7, dated Aug. 17, 2022, with English translation,(33p).

\* cited by examiner

METHOD AND DEVICE FOR CONTROLLING LAUNDRY EQUIPMENT, AND STORAGE MEDIUM

CROSS-REFERENCE TO RELATED APPLICATION

This application claims the benefit of priority to Chinese Application No. 202110152123.7 filed on Feb. 3, 2021, the content of which is incorporated herein by reference in their entirety for all purposes.

TECHNICAL FIELD

The present disclosure relates to the field of household appliances, and more particularly, to a method and device for controlling laundry equipment, and a storage medium.

BACKGROUND

In related art, the Internet of Things applies to various infrastructure fields, such as industry, agriculture, environment, transportation, logistics, security, etc., effectively promoting intelligent development of these aspects, allowing more reasonable use and distribution of limited resources, thereby improving the industry efficiency and benefit.

SUMMARY

The present disclosure provides a method and device for controlling laundry equipment, and a storage medium.

According to a first aspect of the present disclosure, there is provided a method for controlling laundry equipment, implemented at a washing mode sharing platform. The method includes: acquiring, by a washing mode sharing platform, a to-be-shared washing parameter of at least one first laundry equipment, and acquiring a to-be-shared washing mode corresponding to the to-be-shared washing parameter; generating, by the washing mode sharing platform, a historical data set based on the to-be-shared washing parameter and the to-be-shared washing mode; determining a target washing mode and a target washing parameter corresponding to the target washing mode from the historical data set; and sending the target washing mode and the target washing parameter to second laundry equipment.

According to a second aspect of the present disclosure, there is provided a method for controlling laundry equipment, implemented at second laundry equipment. The method includes: acquiring, by second laundry equipment, a target washing mode and a target washing parameter corresponding to the target washing mode from a washing mode sharing platform; and controlling washing a to-be-washed object by the second laundry equipment according to the target washing mode according to the target washing parameter.

According to a third aspect of the present disclosure, there is provided a device for controlling laundry equipment, including: a processor; and a memory configured to store processor executable instructions, wherein the processor is configured to implement: acquiring, by second laundry equipment, a target washing mode and a target washing parameter corresponding to the target washing mode from a washing mode sharing platform; and controlling washing a to-be-washed object by the second laundry equipment according to the target washing mode according to the target washing parameter.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate examples consistent with the present disclosure and, together with the description, serve to explain the principles of the present disclosure.

DETAILED DESCRIPTION

Figure 1:
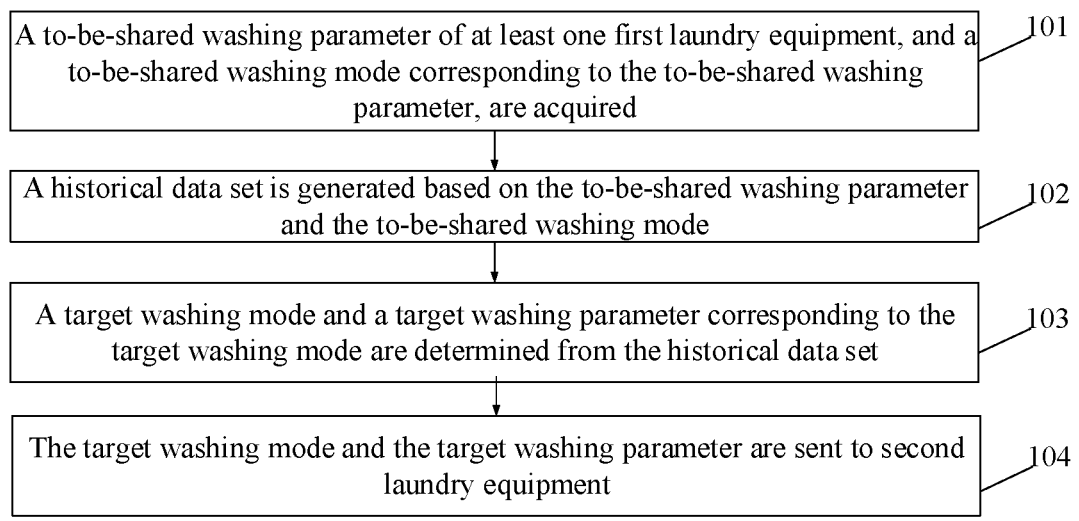
FIG. 1 is a flowchart of a method for controlling laundry equipment according to one or more examples of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

In related art, the Internet of Things applies to various infrastructure fields, such as industry, agriculture, environment, transportation, logistics, security, etc., effectively promoting intelligent development of these aspects, allowing more reasonable use and distribution of limited resources, thereby improving the industry efficiency and benefit.

For example, laundry equipment control, etc., may be implemented through terminal equipment. However, at present, whether laundry equipment is controlled through terminal equipment or directly through the laundry equipment itself, the laundry can only be washed through a program preset by a manufacturer, and a user can only manually modify some parameters. On one hand, as there may be just one fixed program preset by the manufacturer, when the program set by the manufacturer does not meet the need of the user, the user has to modify and adjust the parameters one by one, which increases difficulty and complexity in washing. On the other hand, the user has to try a number of times before she or he can find a right washing parameter corresponding to the laundry, and in this process, the laundry may be damaged or not washed well due to inaccurate parameter selection.

A method for controlling laundry equipment is provided in examples of the present disclosure. FIG. 1 is a flowchart of a method for controlling laundry equipment according to an illustrative example. As shown in FIG. 1, the method may be implemented at a washing mode sharing platform. The method mainly includes steps as follows.

In S101, a to-be-shared washing parameter of at least one first laundry equipment, and a to-be-shared washing mode corresponding to the to-be-shared washing parameter, are acquired.

In S102, a historical data set is generated based on the to-be-shared washing parameter and the to-be-shared washing mode.

In S103, a target washing mode and a target washing parameter corresponding to the target washing mode are determined from the historical data set.

In S104, the target washing mode and the target washing parameter are sent to second laundry equipment.

Here, the first laundry equipment and the second laundry equipment may include drum laundry equipment, pulsator laundry equipment, a washing and drying machine, etc. The washing mode sharing platform may include electronic equipment capable of processing data independently, such as a server. The second laundry equipment may also be referred as the target laundry equipment.

In examples of the present disclosure, the washing mode sharing platform may acquire a to-be-shared washing parameter from at least one first laundry equipment and a to-be-shared washing mode corresponding to the to-be-shared washing parameter. Here, a to-be-shared washing parameter and a to-be-shared washing mode may be acquired actively by the washing mode sharing platform from first laundry equipment, or may be uploaded triggered by a user using first laundry equipment, which is not specifically limited herein. In some examples, there may be multiple pieces of first laundry equipment.

In examples of the present disclosure, after the to-be-shared washing parameter and the to-be-shared washing mode have been acquired, a historical data set may be formed based on the to-be-shared washing parameter and the to-be-shared washing mode acquired, and a mapping relation between a to-be-shared washing parameter and a to-be-shared washing mode.

In use, the washing mode sharing platform may determine a target washing mode and a target washing parameter corresponding to the target washing mode from the historical data set, and send the target washing mode and the target washing parameter to the second laundry equipment, to control washing a to-be-washed object by the second laundry equipment using the target washing parameter according to the target washing mode.

In some examples, a to-be-shared washing parameter includes at least a water temperature, an amount of water, an amount of laundry detergent used, a number of rinses, a spin speed, and a drying time, which are not specifically limited herein.

In examples of the present disclosure, a target washing mode and a target washing parameter corresponding to the target washing mode can be acquired from the washing mode sharing platform. The washing mode sharing platform stores an empirical parameter that has been verified and reviewed. Compared to washing a to-be-washed object through a fixed program preset by a manufacturer in related art, a target washing parameter corresponding to a target washing mode can be acquired directly from the washing mode sharing platform, and laundry equipment can be controlled to wash a to-be-washed object according to the target washing parameter, without having to modify and adjust respective parameters one by one, decreasing difficulty and complexity in washing. In addition, as each washing parameter of the washing mode sharing platform is a viewed and verified empirical parameter ready for a user to download and use without having to make multiple attempts, reducing possibility of a poor washing effect or damage to a to-be-washed object during the user attempts.

In some examples, the method further includes a step as follows.

A washing request may be acquired from the second laundry equipment or terminal equipment communicatively connected to the second laundry equipment.

The target washing mode and the target washing parameter corresponding to the target washing mode may be determined from the historical data set as follows.

The target washing mode and the target washing parameter corresponding to the target washing mode may be determined from the historical data set according to the washing request.

In examples of the present disclosure, a touch display may be provided on the second laundry equipment. The touch display may have both a display function and a touch function. During implementation, both a touch area having a touch function and a display area having a display function may be provided on a door cover of the second laundry equipment. Alternatively, the touch area and the display area may both be provided on other locations on the second laundry equipment, such as on the body of the second laundry equipment.

In other examples, the touch area and the display area of the touch display may be provided separately. For example, the touch area is provided on the body of the second laundry equipment, and the display area is provided on the door cover of the second laundry equipment, which may be provided as needed, and is not specifically limited herein. Of course, a touch display may be provided for the first laundry equipment, in a way same as the second laundry equipment, which is not specifically limited herein.

In some examples, a communication connection between second laundry equipment and terminal equipment may be established. During implementation, the touch display of the second laundry equipment may perform synchronous display with the terminal equipment.

In examples of the present disclosure, for example, a touch display is provided on the body of the second laundry equipment. During implementation, the touch display on the body of the second laundry equipment and the display of the terminal equipment may perform synchronous display. The second laundry equipment may be controlled through the touch display on the body to perform a corresponding function. Alternatively, the second laundry equipment may be controlled through the display of the terminal equipment to perform a corresponding function.

In examples of the present disclosure, a user may input a touch operation through a touch display of second laundry equipment. After detecting the touch operation, the laundry equipment can acquire a washing request based on the touch operation. In some examples, a washing request may be triggered based on a click operation applied to the touch display of the second laundry equipment. For example, a washing request may be triggered based on a click operation, a double-click operation, a long-press operation, etc.

In other examples, when mode icons of multiple washing modes are displayed on the touch display of the second laundry equipment, the user may select a washing mode as needed, and input a corresponding touch operation through a mode icon corresponding to the washing mode selected by the user. Then, the washing request corresponding to the washing mode may be generated. A mode icon may be displayed on the touch display of the second laundry equipment in in graphic or text form.

In other examples, a user may input a touch operation through the display of the terminal equipment. After detecting the touch operation, the terminal equipment can acquire a washing request based on the touch operation, and send the washing request to a washing mode sharing platform. In some examples, a washing request may be triggered based on a click operation applied to the display of the terminal equipment. For example, a washing request may be triggered based on a click operation, a double-click operation, a long-press operation, etc.

In other examples, when mode icons of multiple washing modes are displayed on the display of the terminal equipment, the user may select a washing mode as needed, and input a corresponding touch operation through the mode icon corresponding to the washing mode selected by the user, thereby generating a washing request corresponding to the washing mode.

In examples of the present disclosure, after the second washing device or the terminal equipment has generated the washing request, the washing request may be sent to the washing mode sharing platform. The washing mode sharing platform may determine a target washing mode and a target washing parameter corresponding to the target washing mode from the historical data set according to the washing request.

In examples of the present disclosure, the washing mode sharing platform may acquire the washing request from the second laundry equipment directly, or acquire the washing request through the terminal equipment, thereby improving flexibility in acquiring the washing request.

In some examples, the washing request includes a target mode identifier. The target washing mode may be determined from the historical data set according to the washing request as follows.

The target mode identifier may be compared to a mode identifier of each of the to-be-shared washing mode in the historical data set. The target washing mode may be determined from the historical data set according to a comparison result.

In examples of the present disclosure, since the washing request is generated according to the mode icon of the washing mode required by the user, in generating the washing request, the mode identifier of the washing mode required by the user, that is, the target mode identifier, may be included in the washing request. In examples of the present disclosure, each to-be-shared washing mode has a corresponding mode identifier. During implementation, the target mode identifier may be compared to the mode identifier of each to-be-shared washing mode, and the target washing mode may be determined according to the comparison result. A mode identifier may include a number, a letter, etc.

In some examples, the target washing mode may be determined from the historical data set according to the comparison result as follows.

When the comparison result indicates that there is a to-be-shared washing mode in the historical data set with a mode identifier same as the target mode identifier, the to-be-shared washing mode with the mode identifier same as the target mode identifier may be determined as the target washing mode.

In examples of the present disclosure, the to-be-shared washing mode with the mode identifier same as the target mode identifier is determined as the target washing mode, improving accuracy of a determined target washing mode.

In other examples, when there is no to-be-shared washing mode with a mode identifier same as the target mode identifier, similarity between the target mode identifier and a mode identifier of a to-be-shared washing mode may be determined. A to-be-shared washing mode corresponding to a mode identifier having similarity with the target mode identifier greater than a set similarity threshold may be determined as the target washing mode.

In examples of the present disclosure, to-be-shared washing modes of a plurality of laundry equipment, and a to-be-shared washing parameter corresponding to each to-be-shared washing mode, may be stored to the washing mode sharing platform in form of a historical data set, so that a user may determine, from the historical data set, a target washing mode and a target washing parameter directly corresponding to the target mode identifier. Compared to washing a to-be-washed object through a fixed program preset by a manufacturer in related art, a target washing mode and a target washing parameter corresponding to the target washing mode can be acquired directly from the washing mode sharing platform, and laundry equipment can be controlled to wash a to-be-washed object according to the target washing parameter, without having to modify and adjust respective parameters one by one, decreasing difficulty and complexity in washing.

In examples of the present disclosure, a massive number of users keep uploading and sharing historical washing modes and historical washing parameters. Better washing modes keep being filtered out. Eventually, a user is allowed to acquire a laundry equipment operating program suitable for various clothes or with a better washing effect for same clothes. Program methods suitable for a variety of laundry equipment are created using a massive number of Internet users combining Internet of Things (IoT) technology, improving user experience in using laundry equipment.

Figure 2:
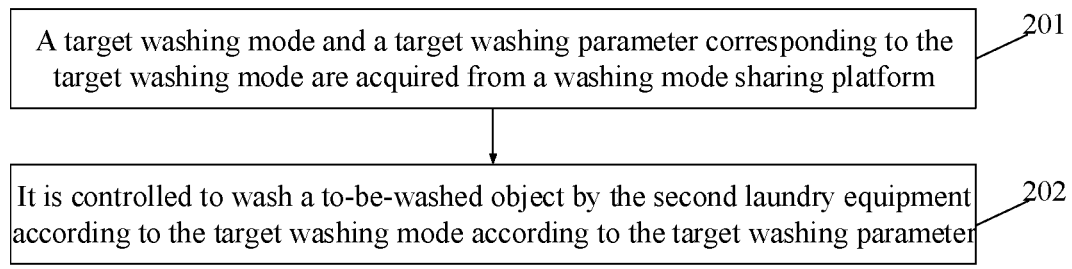
FIG. 2 is a flowchart of a method for controlling laundry equipment according to one or more examples of the present disclosure.

A method for controlling laundry equipment is provided in examples of the present disclosure. FIG. 2 is a flowchart of a method for controlling laundry equipment according to an illustrative example. As shown in FIG. 2, the method may be implemented at second laundry equipment. The method mainly includes steps as follows.

In S201, a target washing mode and a target washing parameter corresponding to the target washing mode are acquired from a washing mode sharing platform.

In S202, it is controlled to wash a to-be-washed object by the second laundry equipment according to the target washing mode according to the target washing parameter.

Here, the second laundry equipment may include drum laundry equipment, pulsator laundry equipment, a washing and drying machine, etc. The washing mode sharing platform may include electronic equipment capable of processing data independently, such as a server.

In examples of the present disclosure, a touch display may be provided on the second laundry equipment. The touch display may have both a display function and a touch function. During implementation, both a touch area having a touch function and a display area having a display function may be provided on a door cover of the second laundry equipment. Alternatively, the touch area and the display area may both be provided on other locations on the second laundry equipment, such as on the body of the second laundry equipment.

In other examples, the touch area and the display area of the touch display may be provided separately. For example, the touch area is provided on the body of the second laundry equipment, and the display area is provided on the door cover of the second laundry equipment, which may be provided as needed, and is not specifically limited herein.

In examples of the present disclosure, for example, a touch display is provided on the body of the second laundry equipment. During implementation, the second laundry equipment may be controlled through the touch display on the body to perform a corresponding function.

Here, a target washing mode may be a mode selected by the user for the to-be-washed object. In some examples, a washing mode may be identified based on a mode icon on the second laundry equipment. For example, a mode icon for identifying a washing mode may be displayed on the touch display of the second laundry equipment. In use, a user may input a washing request through a mode icon displayed on the touch display of the second laundry equipment.

In examples of the present disclosure, a target washing mode and a target washing parameter corresponding to the target washing mode can be acquired from the washing mode sharing platform. The washing mode sharing platform stores an empirical parameter that has been verified and reviewed. Compared to washing a to-be-washed object through a fixed program preset by a manufacturer in related art, a target washing parameter corresponding to a target washing mode can be acquired directly from the washing mode sharing platform, and laundry equipment can be controlled to wash a to-be-washed object according to the target washing parameter, without having to modify and adjust respective parameters one by one, decreasing difficulty and complexity in washing. In addition, as each washing parameter of the washing mode sharing platform is a viewed and verified empirical parameter ready for a user to download and use without having to make multiple attempts, reducing possibility of a poor washing effect or damage to a to-be-washed object during the user attempts.

In some examples, the method further include a step as follows.

After the second laundry equipment has washed the to-be-washed object, a to-be-shared washing parameter may be acquired based on the target washing parameter.

The to-be-shared washing parameter may be uploaded to the washing mode sharing platform based on an uploading instruction detected.

Here, having washed the to-be-washed object, the second laundry equipment may acquire a to-be-shared washing parameter based on the target washing parameter, and upload the washing parameter of the to-be-washed object to the washing mode sharing platform based on an uploading instruction.

Here, since with the present disclosure, a to-be-washed object is washed based on a target washing parameter, after the to-be-washed object has been washed, the user may rate, edit, etc., the target washing parameter, acquiring a washing parameter more suitable for the to-be-washed object, i.e., a to-be-shared washing parameter.

After acquiring the to-be-shared washing parameter, an uploading instruction for the second laundry equipment or the terminal equipment may be detected, and after detecting the uploading instruction, the to-be-shared washing parameter may be uploaded to the washing mode sharing platform to share the washing parameter more suitable for the to-be-washed object with other users.

In examples of the present disclosure, having finished washing the to-be-washed object, the second laundry equipment can acquire a to-be-shared washing parameter based on a target washing parameter, and upload the to-be-shared washing data to the washing mode sharing platform for being shared by other users, thereby implementing washing parameter sharing by making full use of a feature of big data, which is more convenient and relevant than to find a washing mode and a washing parameter suitable for a to-be-washed object by manually attempting different washing modes and washing parameters.

In other examples, if a to-be-washed object is washed based on an initial washing parameter, a to-be-shared washing parameter may be acquired based on the initial washing parameter. The initial washing parameter may be a washing parameter preset by a manufacturer or a user-defined washing parameter. For example, after the second laundry equipment has washed the to-be-washed object based on the initial washing parameter, a to-be-shared washing parameter can be acquired based on the initial washing parameter. For example, the user may rate, edit, etc., the initial washing parameter, acquiring a washing parameter more suitable for the to-be-washed object, i.e., the to-be-shared washing parameter.

In some examples, the to-be-shared washing parameter may be acquired based on the target washing parameter as follows.

The target washing parameter may be edited based on an editing instruction detected, acquiring the to-be-shared washing parameter.

Here, an optimal washing effect may not be achieved after washing the to-be-washed object based on the target washing parameter. If the target washing parameter is uploaded directly to the washing mode sharing platform, other users may be misled. In examples of the present disclosure, after washing the to-be-washed object, the user may input an editing instruction to edit the target washing parameter, such as to input user experience, acquiring a to-be-shared washing parameter.

In examples of the present disclosure, after washing the to-be-washed object based on the target washing parameter, the target washing parameter is not uploaded directly to the washing mode sharing platform. Instead, the target washing parameter may be edited, acquiring a to-be-shared washing parameter. The to-be-shared washing parameter may be uploaded to the washing mode sharing platform, allowing a washing parameter downloaded by another user to be more suitable for a target to be washed, improving washing effect.

In other examples, the method further includes a step as follows.

It may be detected whether there is a sharing instruction for a sharing control on a sharing interface.

An editing interface may be entered after detecting a sharing instruction for a sharing control.

It may be detected whether there is an editing instruction for the editing interface.

The target washing parameter may be edited based on the editing instruction detected, acquiring the to-be-shared washing parameter, as follows.

When an editing instruction for the editing interface is detected, the target washing parameter may be edited, acquiring the to-be-shared washing parameter.

Figure 3:
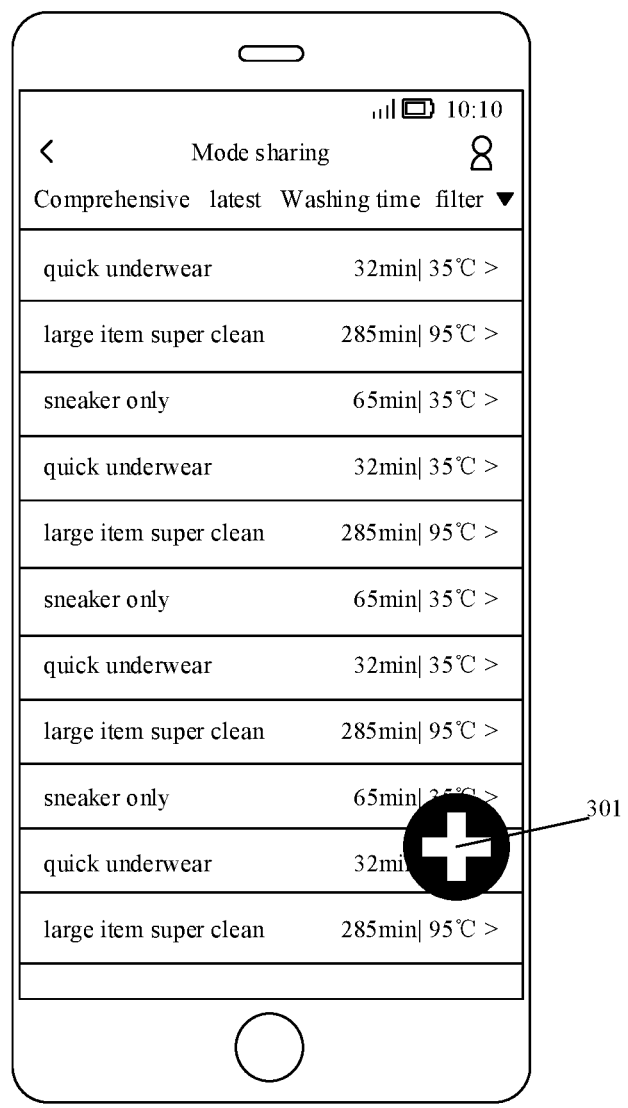
FIG. 3 is an illustrative diagram of a display interface of terminal equipment according to one or more examples of the present disclosure.

FIG. 3 is an illustrative diagram of a display interface of terminal equipment according to an illustrative example. As shown in FIG. 3, a sharing control 301 may be displayed on the display interface of the terminal equipment in a floating manner. When the sharing control is displayed on the display interface of the terminal equipment in a floating manner, the user may drag the sharing control to a corresponding location during use. In other optional examples, the sharing control may be displayed on the display interface of the terminal equipment in another mode, or the sharing control may be displayed on a touch display of laundry equipment.

Figure 4:
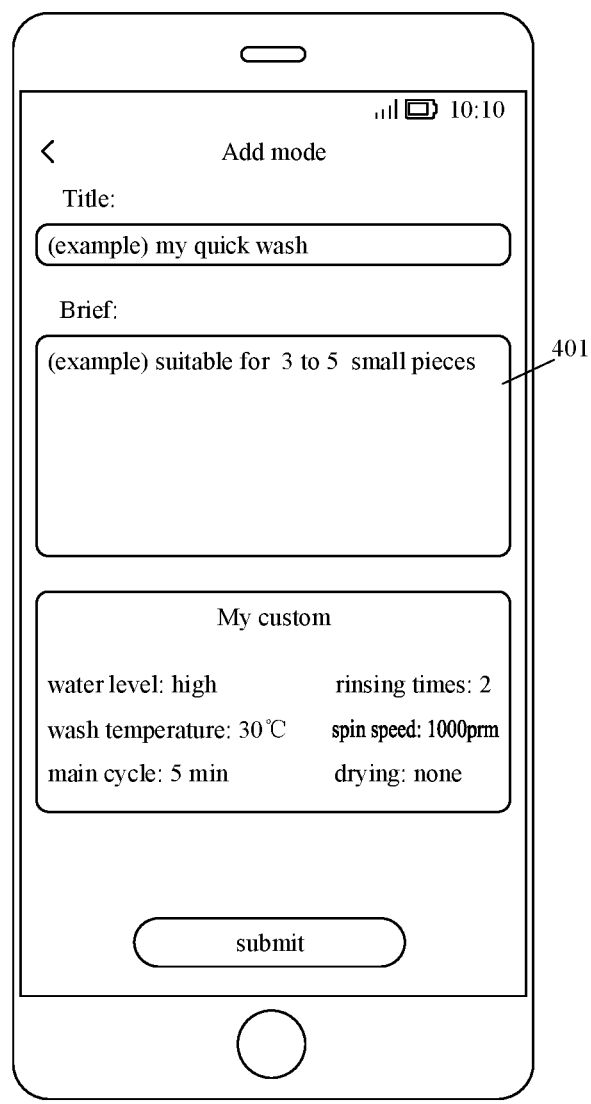
FIG. 4 is an illustrative diagram of a display interface of terminal equipment according to one or more examples of the present disclosure.

FIG. 4 is an illustrative diagram of a display interface of terminal equipment according to an illustrative example. As shown in FIG. 4, a plurality of edit boxes 401 may be displayed on the editing interface, and an editing instruction for an edit box may be detected. Content in an edit box may be edited based on a detected editing instruction. After the editing is completed, it may be detected whether there is an uploading instruction input based on a submit control. When an uploading instruction input based on the submit control is detected, an edited to-be-shared washing parameter may be uploaded to the washing mode sharing platform.

Figure 5:
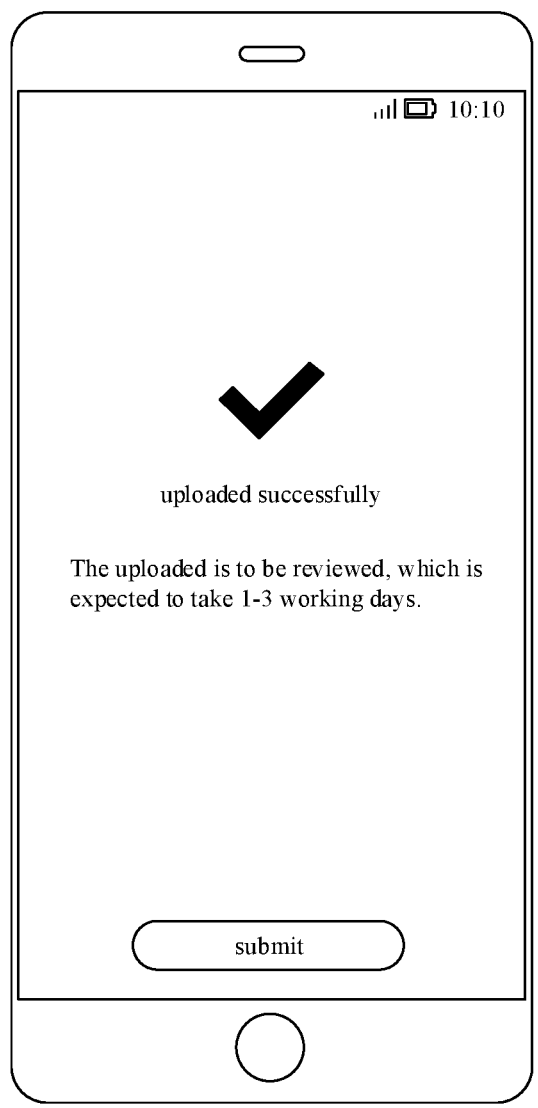
FIG. 5 is an illustrative diagram of a display interface of terminal equipment according to one or more examples of the present disclosure.

FIG. 5 is an illustrative diagram of a display interface of terminal equipment according to an illustrative example. As shown in FIG. 5, after uploading a to-be-shared washing parameter to a washing mode sharing platform, prompt information may be output based on the display interface of the terminal equipment. For example, prompt information of successful uploading, or prompt information of an uploading failure, may be output.

In other examples, after successfully uploading a to-be-shared washing parameter to the washing mode sharing platform, the to-be-shared washing parameter is to be audited before being presented to other users. Here, an uploaded to-be-shared washing parameter may be audited manually, or through a trained mathematical model. For example, an uploaded to-be-shared washing parameter may be audited based on a trained neural network model, which is not specifically limited herein.

Figure 6:
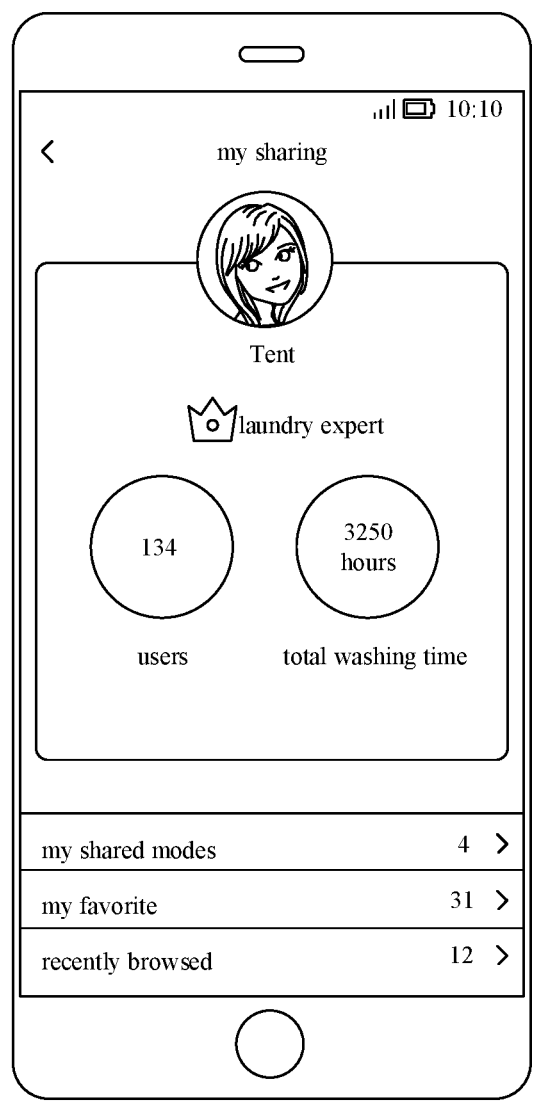
FIG. 6 is an illustrative diagram of a display interface of terminal equipment according to one or more examples of the present disclosure.

FIG. 6 is an illustrative diagram of a display interface of terminal equipment according to an illustrative example. As shown in FIG. 6, a user may enter a "my sharing" interface to browse shared information. The shared information may include a washing mode shared by the user, a washing mode collected by the user, a washing mode recently browsed by the user, etc.

In some examples, the method further includes a step as follows.

A washing request corresponding to the target washing mode may be acquired. The washing request may include a target mode identifier.

The target washing mode and the target washing parameter corresponding to the target washing mode may be acquired from the washing mode sharing platform as follows.

The target washing mode and the target washing parameter corresponding to the target washing mode may be acquired from the washing mode sharing platform based on the target mode identifier.

In examples of the present disclosure, since the washing request is generated according to the mode icon of the washing mode required by the user, in generating the washing request, the mode identifier of the washing mode required by the user, that is, the target mode identifier, may be included in the washing request. In examples of the present disclosure, each to-be-shared washing mode has a corresponding mode identifier. During implementation, the target mode identifier may be compared to the mode identifier of each to-be-shared washing mode, and the target washing mode may be determined according to the comparison result. A mode identifier may include a number, a letter, etc.

During implementation, when the comparison result indicates that there is a to-be-shared washing mode in the historical data set with a mode identifier same as the target mode identifier, the to-be-shared washing mode with the mode identifier same as the target mode identifier may be determined as the target washing mode.

In examples of the present disclosure, a to-be-shared washing mode with a mode identifier same as a target mode identifier is determined as a target washing mode, improving accuracy of a determined target washing mode.

In some examples, the second laundry equipment has a touch display. The second laundry equipment may be communicatively connected to terminal equipment. A washing request corresponding to the target washing mode may be acquired as follows.

The washing request including a target mode identifier may be acquired based on a touch operation applied to a mode icon displayed on the touch display.

Alternatively, the washing request may be acquired from the terminal equipment.

In examples of the present disclosure, a touch display may be provided on the second laundry equipment. The touch display may have both a display function and a touch function. During implementation, both a touch area having a touch function and a display area having a display function may be provided on a door cover of the second laundry equipment. Alternatively, the touch area and the display area may both be provided on other locations on the second laundry equipment, such as on the body of the second laundry equipment.

In other examples, the touch area and the display area of the touch display may be provided separately. For example, the touch area is provided on the body of the second laundry equipment, and the display area is provided on the door cover of the second laundry equipment, which may be provided as needed, and is not specifically limited herein. Of course, a touch display may be provided for the first laundry equipment, in a way same as the second laundry equipment, which is not specifically limited herein.

In some examples, a communication connection between second laundry equipment and terminal equipment may be established. During implementation, the touch display of the second laundry equipment may perform synchronous display with the terminal equipment.

In examples of the present disclosure, for example, a touch display is provided on the body of the second laundry equipment. During implementation, the touch display on the body of the second laundry equipment and the display of the terminal equipment may perform synchronous display. The second laundry equipment may be controlled through the touch display on the body to perform a corresponding function. Alternatively, the second laundry equipment may be controlled through the display of the terminal equipment to perform a corresponding function.

In examples of the present disclosure, a user may input a touch operation through a touch display of second laundry equipment. After detecting the touch operation, the laundry equipment can acquire a washing request based on the touch operation. In some examples, a washing request may be triggered based on a click operation applied to the touch display of the second laundry equipment. For example, a washing request may be triggered based on a click operation, a double-click operation, a long-press operation, etc.

In other examples, when mode icons of multiple washing modes are displayed on the touch display of the second laundry equipment, the user may select a washing mode as needed, and input a corresponding touch operation through a mode icon corresponding to the washing mode selected by the user. Then, the washing request corresponding to the washing mode may be generated. A mode icon may be displayed on the touch display of the second laundry equipment in in graphic or text form.

In other examples, when mode icons of multiple washing modes are displayed on the touch display of the second laundry equipment, a filter control may also be displayed on the touch display. For example, the filter control may be displayed above the mode icons of the multiple washing modes. In some examples, the filter control may also be displayed at another location on the touch display, which is not specifically limited herein.

In other examples, a user may input a touch operation through the display of the terminal equipment. After detecting the touch operation, the terminal equipment can acquire a washing request based on the touch operation, and send the washing request to a washing mode sharing platform. In some examples, a washing request may be triggered based on a click operation applied to the display of the terminal equipment. For example, a washing request may be triggered based on a click operation, a double-click operation, a long-press operation, etc.

In other examples, when mode icons of multiple washing modes are displayed on the display of the terminal equipment, the user may select a washing mode as needed, and input a corresponding touch operation through the mode icon corresponding to the washing mode selected by the user, thereby generating a washing request corresponding to the washing mode.

In other examples, when mode icons of multiple washing modes are displayed on the display of the terminal equipment, a filter control may also be displayed on the display of the terminal equipment. For example, the filter control may be displayed above the multiple mode icons. In some examples, the filter control may also be displayed at another location on the display of the terminal equipment, which is not specifically limited herein.

Figure 7:
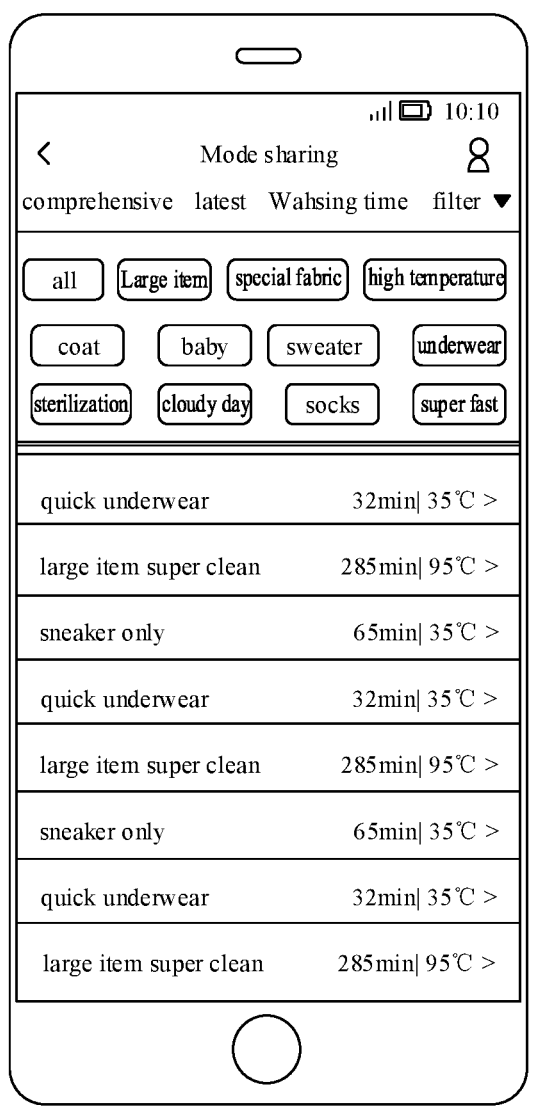
FIG. 7 is an illustrative diagram of a display interface of terminal equipment according to one or more examples of the present disclosure.

For example, the user inputs a touch operation through the display of the terminal equipment. FIG. 7 is an illustrative diagram of a display interface of terminal equipment according to an illustrative example. As shown in FIG. 7, mode icons of a plurality of washing modes may be displayed on a display interface of terminal equipment. For example, mode identifiers of a quick underwear mode, a large item super clean mode, a sneaker only mode, etc., may be displayed on the display interface in form of text. During implementation, a user may trigger a washing request through a mode icon. For example, a corresponding washing request may be triggered by clicking on text such as "quick underwear", "large item super clean", "sneaker only", etc.

In FIG. 7, a filter control may be displayed above the mode icons. The filter control may include a fabric filter control, a type filter control, a temperature filter control, etc. In some examples, a washing duration and a washing temperature required to perform a washing mode corresponding to a mode icon can also be displayed on the display interface in displaying the mode icon. For example, to perform the quick underwear mode, a washing time of 32 minutes and a washing temperature greater than 35° C. are needed. To perform the large item super clean mode, a washing time of 285 minutes and a washing temperature greater than 95° C. are needed.

Figure 8:
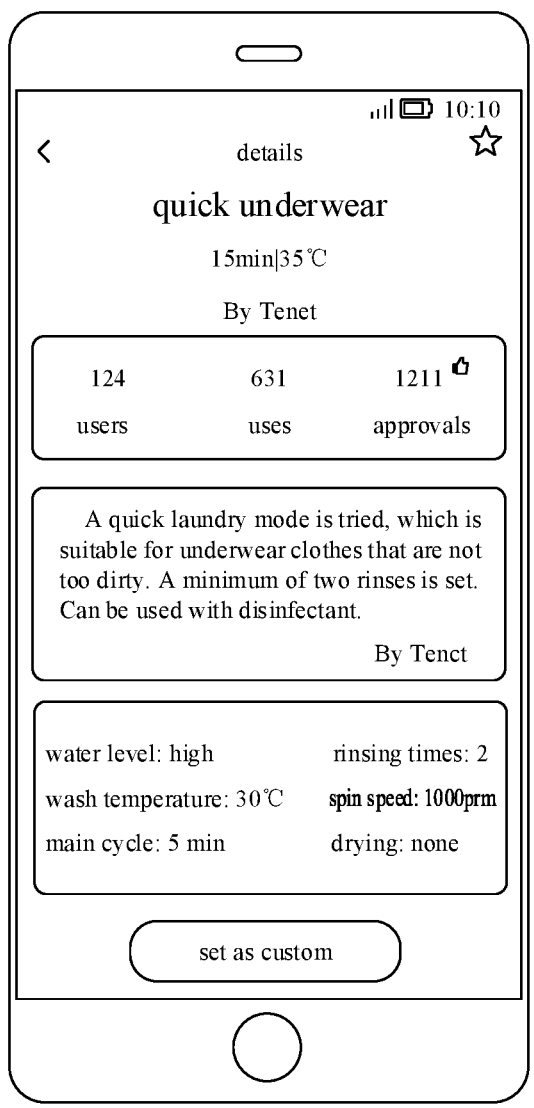
FIG. 8 is an illustrative diagram of a display interface of terminal equipment according to one or more examples of the present disclosure.

In other examples, after triggering a washing request, a washing parameter in a washing mode corresponding to the washing request may be displayed on a browsing interface of the touch display of laundry equipment, or on a browsing interface of the display of the terminal equipment. FIG. 8 is an illustrative diagram of a display interface of terminal equipment according to an illustrative example. As shown in FIG. 8, washing parameters of a quick underwear mode may be displayed on the browsing interface of the display of the terminal equipment. The washing parameters may include a number of users using the quick underwear mode, a number of uses, and a number of users approving the quick underwear mode. In addition, evaluation of using the quick underwear mode by the user may also be displayed on the browsing interface.

In other examples, the user may also set a washing mode corresponding to washing parameters displayed on the browsing interface as a custom mode based on a custom control on the browsing interface. In this way, to use the washing mode again, the user can determine the washing mode directly from a custom mode set, without having to enter the washing mode sharing platform and perform download again.

In other examples, content displayed on the display interface of the terminal equipment may be displayed synchronously on the touch display of the second laundry equipment.

In examples of the present disclosure, a user can select a control mode as needed. For example, a touch operation may be input directly through the touch display of second laundry equipment to control the laundry equipment. Alternatively, laundry equipment may be controlled through terminal equipment, improving flexibility in controlling the laundry equipment.

In some examples, the method further includes a step as follows.

A mode icon of a candidate washing mode may be displayed in a set order on a touch display of the second laundry equipment, or on a display interface of terminal equipment.

The mode icon may be configured to identify the candidate washing mode corresponding to the mode icon.

Here, a target washing mode may be a mode selected by the user for the to-be-washed object. In some examples, a washing mode may be identified based on a mode icon. For example, a mode icon for identifying a washing mode may be displayed on the touch display of the second laundry equipment, or on the display interface of the terminal equipment. In use, a user may input a washing request through a mode icon displayed on the touch display of the second laundry equipment, or through a mode icon displayed on the display interface of the terminal equipment.

In some examples, a user may input a washing request through the touch display of the second laundry equipment, for example. After detecting the washing request triggered through the touch display, the second laundry equipment may send the washing request to the washing mode sharing platform. In other examples, after acquiring the washing request, the second laundry equipment may also send the washing request to the washing mode sharing platform through the terminal equipment.

In other examples, for example, the user may input a washing request through the terminal equipment. After detecting a trigger operation applied to the display of the terminal equipment, the terminal equipment may generate a washing request based on the trigger operation, and send the washing request to the washing mode sharing platform.

In examples of the present disclosure, after a washing request is sent to the washing mode sharing platform, the washing mode sharing platform can determine a target washing mode and a target washing parameter corresponding to the target washing mode based on the washing request, and send the target washing mode and the target washing parameter to the second laundry equipment.

In some examples, while using laundry equipment (including the first laundry equipment and the second laundry equipment), a user may upload a washing parameter used in washing a to-be-washed object using the laundry equipment to a target washing mode device, so as to be shared by users. To use a washing parameter in a target washing mode, a user can input a washing request based on the touch display of the laundry equipment or the display of the terminal equipment, and acquire any target washing parameter corresponding to the target washing mode selected by the user from the target washing mode based on a washing request generated by the washing request.

As may be seen from the examples, with the present disclosure, when a washing request is detected, the washing request can be sent to a washing mode sharing platform, to acquire a target washing mode and a target washing parameter from the washing mode sharing platform. After acquiring the target washing mode and the target washing parameter, laundry equipment can be controlled to wash a to-be-washed object according to the target washing mode and the target washing parameter.

In examples of the present disclosure, a target washing mode and a target washing parameter corresponding to the target washing mode can be acquired from the washing mode sharing platform. The washing mode sharing platform stores an empirical parameter that has been verified and reviewed. Compared to washing a to-be-washed object through a fixed program preset by a manufacturer in related art, a target washing parameter corresponding to a target washing mode can be acquired directly from the washing mode sharing platform, and laundry equipment can be controlled to wash a to-be-washed object according to the target washing parameter, without having to modify and adjust respective parameters one by one, decreasing difficulty and complexity in washing. In addition, as each washing parameter of the washing mode sharing platform is a viewed and verified empirical parameter ready for a user to download and use without having to make multiple attempts, reducing possibility of a poor washing effect or damage to a to-be-washed object during the user attempts.

Here, a set order may be determined according to a frequency of using a washing mode or a user rating. In other examples, the set order may also be determined according to the washing duration required to perform a washing mode. As shown in FIG. 7, in case the user triggers the washing time control, washing modes may be sorted according to the washing duration.

In examples of the present disclosure, washing modes can be sorted according to a set order, so that during use, a user can sort the washing modes as needed, thereby quickly locating a washing mode to be selected by the user.

Figure 9:
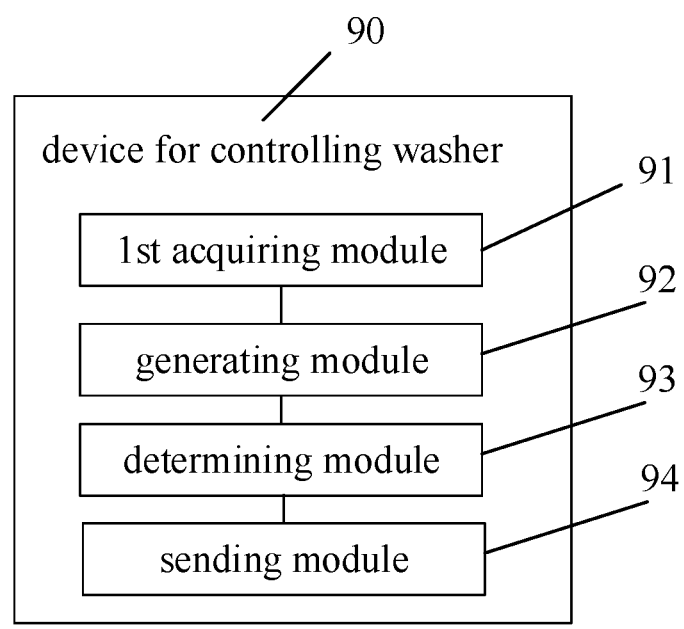
FIG. 9 is a block diagram of a device for controlling laundry equipment according to one or more examples of the present disclosure.

FIG. 9 is a block diagram of a device for controlling laundry equipment according to an illustrative example. As shown in FIG. 9, the device 90 includes a first acquiring module, a generating module, a determining module, and a sending module.

The first acquiring module 91 is configured to acquire a to-be-shared washing parameter of at least one first laundry equipment, and a to-be-shared washing mode corresponding to the to-be-shared washing parameter.

The generating module 92 is configured to generate a historical data set based on the to-be-shared washing parameter and the to-be-shared washing mode.

The determining module 93 is configured to determine a target washing mode and a target washing parameter corresponding to the target washing mode from the historical data set.

The sending module 94 is configured to send the target washing mode and the target washing parameter to second laundry equipment.

In some examples, the device 90 further includes a second acquiring module.

The second acquiring module may be configured to acquire a washing request from the second laundry equipment or terminal equipment communicatively connected to the second laundry equipment.

The determining module 93 may be further configured to: determine the target washing mode and the target washing parameter corresponding to the target washing mode from the historical data set according to the washing request.

In some examples, the washing request includes a target mode identifier.

The determining module 93 may be further configured to: compare the target mode identifier to a mode identifier of each of the to-be-shared washing mode in the historical data set, and determine the target washing mode from the historical data set according to a comparison result.

In some examples, the determining module 93 may be further configured to:
in response to the comparison result indicating a to-be-shared washing mode in the historical data set with a mode identifier same as the target mode identifier, determine, as the target washing mode, the to-be-shared washing mode with the mode identifier same as the target mode identifier.

Figure 10:
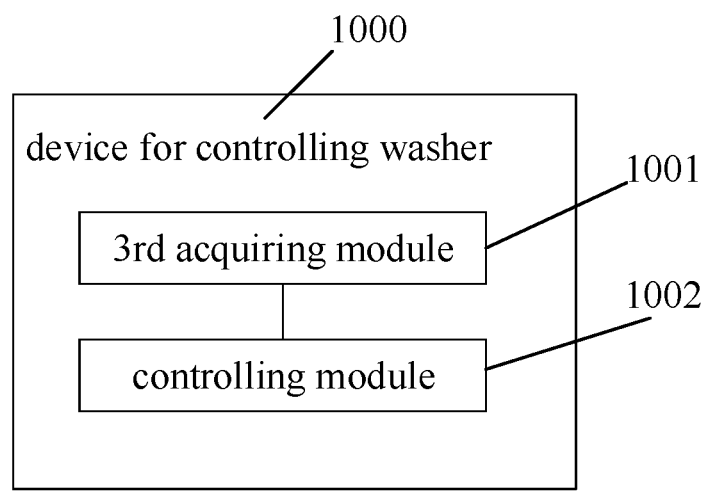
FIG. 10 is a block diagram of a device for controlling laundry equipment according to one or more examples of the present disclosure.

FIG. 10 is a block diagram of a device for controlling laundry equipment according to an illustrative example. As shown in FIG. 10, the device may be implemented at second laundry equipment. The device 1000 includes a third acquiring module and a controlling module.

The third acquiring module 1001 is configured to acquire, from a washing mode sharing platform, a target washing mode and a target washing parameter corresponding to the target washing mode.

The controlling module 1002 is configured to control washing a to-be-washed object by the second laundry equipment according to the target washing mode according to the target washing parameter.

In some examples, the device 1000 further includes a fourth acquiring module and an uploading module.

The fourth acquiring module may be configured to, after the second laundry equipment has washed the to-be-washed object, acquire a to-be-shared washing parameter based on the target washing parameter.

The uploading module may be configured to upload the to-be-shared washing parameter to the washing mode sharing platform based on an uploading instruction detected.

In some examples, the fourth acquiring module is further configured to:
edit the target washing parameter based on an editing instruction detected, acquiring the to-be-shared washing parameter.

In some examples, the device 1000 further includes a fifth acquiring module.

The fifth acquiring module may be configured to acquire a washing request corresponding to the target washing mode. The washing request may include a target mode identifier.

The third acquiring module 1001 may be further configured to:
acquire, from the washing mode sharing platform based on the target mode identifier, the target washing mode and the target washing parameter corresponding to the target washing mode.

In some examples, the second laundry equipment has a touch display. The second laundry equipment may be communicatively connected to terminal equipment. The third acquiring module 1001 may be further configured to:
acquire the washing request including a target mode identifier based on a touch operation applied to a mode icon displayed on the touch display; or
acquire the washing request from the terminal equipment.

In some examples, the device 1000 further includes a displaying module.

The displaying module may be configured to display a mode icon of a candidate washing mode in a set order on a touch display of the second laundry equipment, or on a display interface of terminal equipment.

The mode icon may be configured to identify the candidate washing mode corresponding to the mode icon.

A module of a device according to an aforementioned example may perform an operation in a mode elaborated in an example of a method herein, which will not be repeated here.

Figure 11:
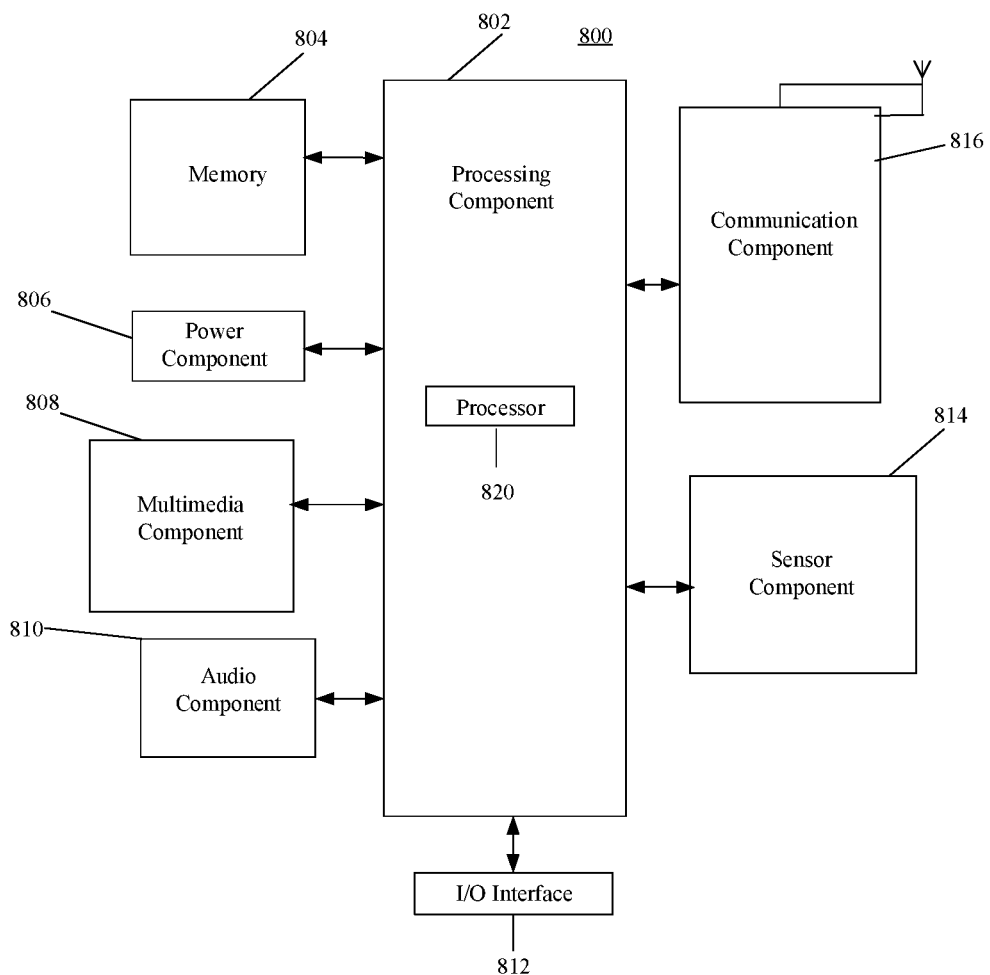
FIG. 11 is a block diagram of hardware of a device for controlling laundry equipment according to one or more examples of the present disclosure.

FIG. 11 is a block diagram of hardware of a device 800 for controlling laundry equipment according to an illustrative example. For example, the device 800 may be a mobile phone, a computer, a digital broadcasting terminal, a message transceiver, a game console, tablet equipment, medical equipment, fitness equipment, a Personal Digital Assistant (PDA), etc.

Referring to FIG. 11, the device 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the device 800. Examples of these data include instructions of any application or method configured to operate on the device 800, contact data, phonebook data, messages, images, videos, and/etc. The memory 804 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the device 800. The power component 806 may include a power management system, one or more power supplies, and other components related to generating, managing and distributing electric power for the device 800.

The multimedia component 808 includes a screen providing an output interface between the device 800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 808 includes a front camera and/or a rear camera. When the device 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the device 800 is in an operation mode such as a call mode, a recording mode, and a voice recognition mode, the MIC is configured to receive an external audio signal. The received audio signal may be further stored in the memory 804 or may be sent via the communication component 816. In some examples, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the device 800. For example, the sensor component 814 may detect an on/off state of the device 800 and relative location of components such as the display and the keypad of the device 800. The sensor component 814 may further detect a change in the location of the device 800 or of a component of the device 800, whether there is contact between the device 800 and a user, the orientation or acceleration/deceleration of the device 800, and a change in the temperature of the device 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless/radio communication between the device 800 and other equipment. The device 800 may access a radio network based on a communication standard such as WiFi, 2G, 3G, . . . , or a combination thereof. In an illustrative example, the communication component 816 broadcasts related information or receives a broadcast signal from an external broadcast management system via a broadcast channel. In an illustrative example, the communication component 816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative example, the device 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative example, a non-transitory computer-readable storage medium including instructions, such as the memory 804 including instructions, is further provided. The instructions may be executed by the processor 820 of the device 800 to implement an aforementioned method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A non-transitory computer-readable storage medium has stored therein instructions which, when executed by a processor of a device for controlling laundry equipment, allow the device for controlling laundry equipment to implement a method for controlling laundry equipment. The method is implemented at second laundry equipment. The method includes:

acquiring, from a washing mode sharing platform, a target washing mode and a target washing parameter corresponding to the target washing mode; and controlling washing a to-be-washed object by the second laundry equipment according to the target washing mode according to the target washing parameter.

Figure 12:
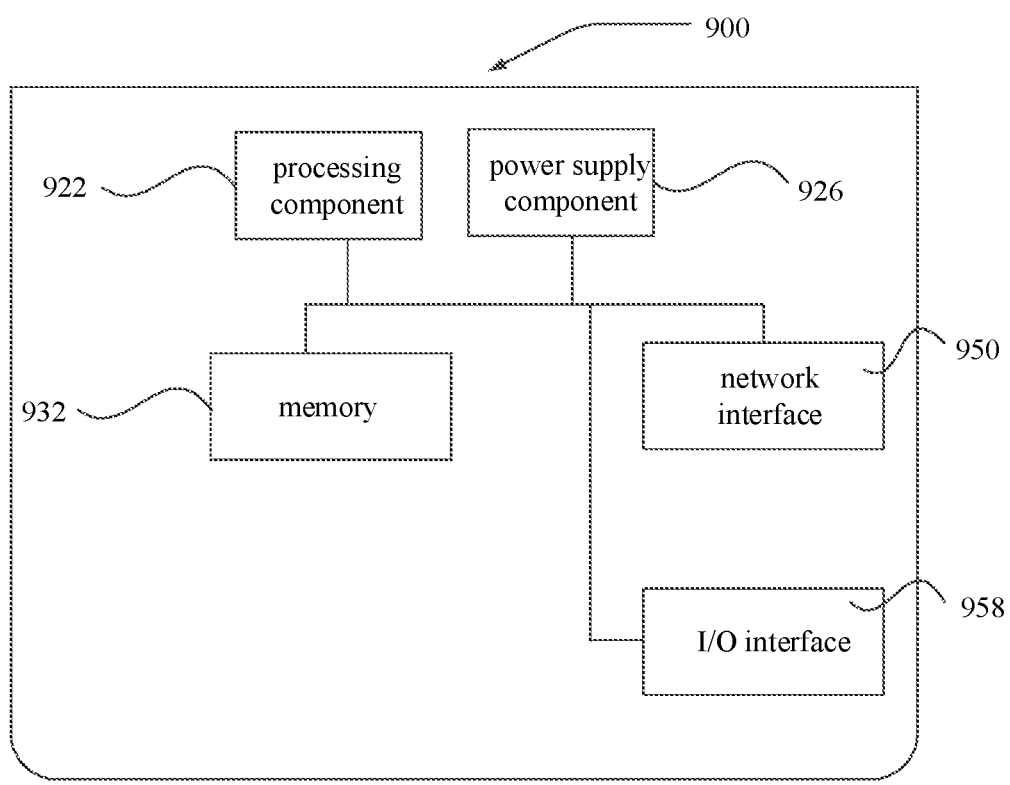
FIG. 12 is a block diagram of hardware of a device for controlling laundry equipment according to one or more examples of the present disclosure.

FIG. 12 is a block diagram of hardware of a device for controlling laundry equipment according to an illustrative example. For example, the device 900 may be provided as a server. Referring to FIG. 12, the device 900 may include a processing component 922. The processing component may include one or more processors. The device may include a memory resource represented by memory 932. The memory resource may be configured for storing an instruction executable by the processing component 922, such as an APP. The APP stored in the memory 932 may include one or more modules. Each of the one or more modules may correspond to a group of instructions. In addition, the processing component 922 may be configured to execute instructions to implement the method for controlling laundry equipment. The method is implemented at a washing mode sharing platform. The method includes:

acquiring a to-be-shared washing parameter of at least one first laundry equipment, and a to-be-shared washing mode corresponding to the to-be-shared washing parameter;

generating a historical data set based on the to-be-shared washing parameter and the to-be-shared washing mode;

determining a target washing mode and a target washing parameter corresponding to the target washing mode from the historical data set; and sending the target washing mode and the target washing parameter to second laundry equipment.

The device 900 may further include a power supply component 926. The power supply component may be configured for managing power of the device 900. The device may further include a wired or wireless network interface 950 configured for connecting the device 900 to a network. The device may further include an Input/Output (I/O) interface 958. The device 900 may operate based on an operating system stored in the memory 932, such as a Windows Server™, a Mac OS X™, a Unix™, a Linux™, a FreeBSD™, etc.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

According to a first aspect of the present disclosure, there is provided a method for controlling laundry equipment, implemented at a washing mode sharing platform. The method includes:

acquiring a to-be-shared washing parameter of at least one first laundry equipment, and a to-be-shared washing mode corresponding to the to-be-shared washing parameter;

generating a historical data set based on the to-be-shared washing parameter and the to-be-shared washing mode;

determining a target washing mode and a target washing parameter corresponding to the target washing mode from the historical data set; and sending the target washing mode and the target washing parameter to second laundry equipment.

Optionally, the method further includes:

acquiring a washing request from the second laundry equipment or terminal equipment communicatively connected to the second laundry equipment.

Determining the target washing mode and the target washing parameter corresponding to the target washing mode from the historical data set may include:

determining the target washing mode and the target washing parameter corresponding to the target washing mode from the historical data set according to the washing request.

Optionally, the washing request includes a target mode identifier. Determining the target washing mode from the historical data set according to the washing request may include:

comparing the target mode identifier to a mode identifier of each of the to-be-shared washing mode in the historical data set, and determining the target washing mode from the historical data set according to a comparison result.

Optionally, determining the target washing mode from the historical data set according to the comparison result includes:

in response to the comparison result indicating a to-be-shared washing mode in the historical data set with a mode identifier same as the target mode identifier, determining, as the target washing mode, the to-be-shared washing mode with the mode identifier same as the target mode identifier.

According to a second aspect of the present disclosure, there is provided a method for controlling laundry equipment, implemented at second laundry equipment. The method includes:

acquiring, from a washing mode sharing platform, a target washing mode and a target washing parameter corresponding to the target washing mode; and controlling washing a to-be-washed object by the second laundry equipment according to the target washing mode according to the target washing parameter.

Optionally, the method further includes:

after the second laundry equipment has washed the to-be-washed object, acquiring a to-be-shared washing parameter based on the target washing parameter; and uploading the to-be-shared washing parameter to the washing mode sharing platform based on an uploading instruction detected.

Optionally, acquiring the to-be-shared washing parameter based on the target washing parameter includes:

editing the target washing parameter based on an editing instruction detected, acquiring the to-be-shared washing parameter.

Optionally, the method further includes:

acquiring a washing request corresponding to the target washing mode, wherein the washing request includes a target mode identifier.

Acquiring, from the washing mode sharing platform, the target washing mode and the target washing parameter corresponding to the target washing mode may include:

acquiring, from the washing mode sharing platform based on the target mode identifier, the target washing mode and the target washing parameter corresponding to the target washing mode.

Optionally, the second laundry equipment has a touch display. The second laundry equipment may be communicatively connected to terminal equipment. Acquiring a washing request corresponding to the target washing mode may include:

acquiring the washing request including a target mode identifier based on a touch operation applied to a mode icon displayed on the touch display; or acquiring the washing request from the terminal equipment.

Optionally, the method further includes:

displaying a mode icon of a candidate washing mode in a set order on a touch display of the second laundry equipment, or on a display interface of terminal equipment.

The mode icon may be configured to identify the candidate washing mode corresponding to the mode icon.

According to a third aspect of the present disclosure, there is provided a device for controlling laundry equipment, implemented at a washing mode sharing platform. The device includes a first acquiring module, a generating module, a determining module, and a sending module.

The first acquiring module is configured to acquire a to-be-shared washing parameter of at least one first laundry equipment, and a to-be-shared washing mode corresponding to the to-be-shared washing parameter.

The generating module is configured to generate a historical data set based on the to-be-shared washing parameter and the to-be-shared washing mode.

The determining module is configured to determine a target washing mode and a target washing parameter corresponding to the target washing mode from the historical data set.

The sending module is configured to send the target washing mode and the target washing parameter to second laundry equipment.

Optionally, the device further includes a second acquiring module.

The second acquiring module may be configured to acquire a washing request from the second laundry equipment or terminal equipment communicatively connected to the second laundry equipment.

The determining module may be further configured to: determine the target washing mode and the target washing parameter corresponding to the target washing mode from the historical data set according to the washing request.

Optionally, the washing request includes a target mode identifier.

The determining module may be further configured to: compare the target mode identifier to a mode identifier of each of the to-be-shared washing mode in the historical data set, and determine the target washing mode from the historical data set according to a comparison result.

Optionally, the determining module may be further configured to:

in response to the comparison result indicating a to-be-shared washing mode in the historical data set with a mode identifier same as the target mode identifier, determine, as the target washing mode, the to-be-shared washing mode with the mode identifier same as the target mode identifier.

According to a fourth aspect of the present disclosure, there is provided a device for controlling laundry equipment, implemented at second laundry equipment. The device includes a third acquiring module and a controlling module.

The third acquiring module is configured to acquire, from a washing mode sharing platform, a target washing mode and a target washing parameter corresponding to the target washing mode.

The controlling module is configured to control washing a to-be-washed object by the second laundry equipment according to the target washing mode according to the target washing parameter.

Optionally, the device further includes a fourth acquiring module and an uploading module.

The fourth acquiring module may be configured to, after the second laundry equipment has washed the to-be-washed object, acquire a to-be-shared washing parameter based on the target washing parameter.

The uploading module may be configured to upload the to-be-shared washing parameter to the washing mode sharing platform based on an uploading instruction detected.

Optionally, the fourth acquiring module is further configured to:

edit the target washing parameter based on an editing instruction detected, acquiring the to-be-shared washing parameter.

Optionally, the device further includes a fifth acquiring module.

The fifth acquiring module may be configured to acquire a washing request corresponding to the target washing mode. The washing request may include a target mode identifier.

The third acquiring module may be further configured to:

acquire, from the washing mode sharing platform based on the target mode identifier, the target washing mode and the target washing parameter corresponding to the target washing mode.

Optionally, the second laundry equipment has a touch display. The second laundry equipment may be communicatively connected to terminal equipment. The third acquiring module may be further configured to:

acquire the washing request including a target mode identifier based on a touch operation applied to a mode icon displayed on the touch display; or acquire the washing request from the terminal equipment.

Optionally, the device further includes a displaying module.

The displaying module may be configured to display a mode icon of a candidate washing mode in a set order on a touch display of the second laundry equipment, or on a display interface of terminal equipment.

The mode icon may be configured to identify the candidate washing mode corresponding to the mode icon.

According to a fifth aspect of the present disclosure, there is provided a device for controlling laundry equipment, including:

a processor; and
a memory configured to store processor executable instructions.

The processor is configured to implement any method of the first aspect, or may be configured to implement any method of the second aspect.

According to a sixth aspect of the present disclosure, there is provided a non-transitory computer-readable storage medium having stored therein instructions which, when executed by a processor of a device for controlling laundry equipment, allow the device for controlling laundry equipment to implement any method of the first aspect, or may be configured to implement any method of the second aspect.

A technical solution provided by examples of the present disclosure may include beneficial effects as follows.

As may be seen from the examples, in the present disclosure, a washing mode sharing platform may generate a historical data set based on a to-be-shared washing parameter and a to-be-shared washing mode acquired from first laundry equipment, and send a target washing mode and a target washing parameter determined from the historical data set to second laundry equipment, allowing the second laundry equipment to wash a to-be-washed object according to the target washing mode and the target washing parameter.

In examples of the present disclosure, a target washing mode and a target washing parameter corresponding to the target washing mode can be acquired from the washing mode sharing platform. The washing mode sharing platform stores an empirical parameter that has been verified and reviewed. Compared to washing a to-be-washed object through a fixed program preset by a manufacturer in related art, a target washing parameter corresponding to a target washing mode can be acquired directly from the washing mode sharing platform, and laundry equipment can be controlled to wash a to-be-washed object according to the target washing parameter, without having to modify and adjust respective parameters one by one, decreasing difficulty and complexity in washing. In addition, as each washing parameter of the washing mode sharing platform is a viewed and verified empirical parameter ready for a user to download and use without having to make multiple attempts, reducing possibility of a poor washing effect or damage to a to-be-washed object during the user attempts.

What is claimed is:

1. A method for controlling laundry equipment, comprising:
    acquiring, by a washing mode sharing platform, a to-be-shared washing parameter of at least one first laundry equipment, and acquiring a to-be-shared washing mode corresponding to the to-be-shared washing parameter;
    generating, by the washing mode sharing platform, a historical data set based on the to-be-shared washing parameter and the to-be-shared washing mode corresponding to the to-be-shared washing parameter;
    acquiring a washing request from second laundry equipment or terminal equipment connected to the second laundry equipment, wherein the washing request comprises a target mode identifier;
    determining, by the washing mode sharing platform according to the washing request, a target washing mode and a target washing parameter corresponding to the target washing mode from the historical data set, comprising:
        comparing the target mode identifier to a mode identifier of a to-be-shared washing mode in the historical data set;
        in response to a comparison result indicating that there is no to-be-shared washing mode in the historical data set with a mode identifier same as the target mode identifier, determining similarity between the target mode identifier and the mode identifier of the to-be-shared washing mode in the historical data set, and determining, as the target washing mode, a to-be-shared washing mode corresponding to a mode identifier having similarity with the target mode identifier greater than a set similarity threshold; and
    sending, by the washing mode sharing platform, the target washing mode and the target washing parameter to the second laundry equipment.

2. The method claim 1, wherein determining the target washing mode from the historical data set comprises:
    in response to the comparison result indicating a to-be-shared washing mode in the historical data set with a mode identifier same as the target mode identifier, determining, as the target washing mode, the to-be-shared washing mode with the mode identifier same as the target mode identifier.

3. A method for controlling laundry equipment, comprising:
    acquiring, by a target laundry equipment, a target washing mode and a target washing parameter corresponding to the target washing mode from a washing mode sharing platform;
    controlling washing a to-be-washed object by the target laundry equipment according to the target washing mode according to the target washing parameter corresponding to the target washing mode;
    in response to completing washing the to-be-washed object by the target laundry equipment, editing the target washing parameter based on an editing instruction detected, and acquiring a to-be-shared washing parameter; and
    uploading the to-be-shared washing parameter to the washing mode sharing platform based on an uploading instruction detected.

4. The method of claim 3, further comprising:
    acquiring a washing request corresponding to the target washing mode, wherein the washing request comprises a target mode identifier,
    wherein acquiring the target washing mode and the target washing parameter corresponding to the target washing mode from the washing mode sharing platform comprises:
    acquiring, from the washing mode sharing platform based on the target mode identifier, the target washing mode and the target washing parameter corresponding to the target washing mode.

5. The method of claim 4, further comprising:
    displaying a mode icon of a candidate washing mode in a set order on a touch display of the target laundry equipment, or on a display interface of terminal equipment,
    wherein the mode icon is configured to identify the candidate washing mode corresponding to the mode icon.

6. The method of claim 3, wherein the target laundry equipment comprises a touch display, and the target laundry equipment is connected to terminal equipment, and wherein acquiring a washing request corresponding to the target washing mode comprises:
    acquiring the washing request comprising a target mode identifier based on a touch operation applied to a mode icon displayed on the touch display; or
    acquiring the washing request from the terminal equipment.

7. The method of claim 6, further comprising:
    displaying a mode icon of a candidate washing mode in a set order on a touch display of the target laundry equipment, or on a display interface of terminal equipment, wherein the mode icon is configured to identify the candidate washing mode corresponding to the mode icon.

8. The method of claim 3, further comprising:
displaying a mode icon of a candidate washing mode in a set order on a touch display of the target laundry equipment, or on a display interface of terminal equipment,
wherein the mode icon is configured to identify the candidate washing mode corresponding to the mode icon.

9. A device for controlling laundry equipment, comprising:
a processor; and
a memory configured to store processor executable instructions,
wherein the processor is configured to implement:
acquiring, by a target laundry equipment, a target washing mode and a target washing parameter corresponding to the target washing mode from a washing mode sharing platform;
controlling washing a to-be-washed object by the target laundry equipment according to the target washing mode according to the target washing parameter corresponding to the target washing mode;
in response to completing washing the to-be-washed object by the target laundry equipment, editing the target washing parameter based on an editing instruction detected, and acquiring a to-be-shared washing parameter; and
uploading the to-be-shared washing parameter to the washing mode sharing platform based on an uploading instruction detected.

10. The device of claim 9, wherein the processor is further configured to implement:
acquiring a washing request corresponding to the target washing mode, wherein the washing request comprises a target mode identifier,
wherein the processor is configured to implement acquiring the target washing mode and the target washing parameter corresponding to the target washing mode from the washing mode sharing platform, by:
acquiring, from the washing mode sharing platform based on the target mode identifier, the target washing mode and the target washing parameter corresponding to the target washing mode.

11. The device of claim 9, wherein the target laundry equipment comprises a touch display, and the target laundry equipment is connected to terminal equipment, and wherein the processor is configured to implement acquiring a washing request corresponding to the target washing mode by:
acquiring the washing request comprising a target mode identifier based on a touch operation applied to a mode icon displayed on the touch display; or
acquiring the washing request from the terminal equipment.

12. The device of claim 9, wherein the processor is further configured to implement:
displaying a mode icon of a candidate washing mode in a set order on a touch display of the target laundry equipment, or on a display interface of terminal equipment,
wherein the mode icon is configured to identify the candidate washing mode corresponding to the mode icon.

* * * * *